US012754504B2

(12) United States Patent
Takatsu

(10) Patent No.: US 12,754,504 B2
(45) Date of Patent: Oct. 6, 2026

(54) IMAGE FORMING SYSTEM FOR INSPECTING A PRINTED IMAGE

(71) Applicant: CANON KABUSHIKI KAISHA, Tokyo (JP)

(72) Inventor: Junya Takatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/077,383

(22) Filed: Mar. 12, 2025

(65) Prior Publication Data

US 2025/0291295 A1 Sep. 18, 2025

(30) Foreign Application Priority Data

Mar. 15, 2024 (JP) ................................ 2024-041488

(51) Int. Cl.

| | |
|---|---|
| ***G03G 15/00*** | (2006.01) |
| ***G06T 7/00*** | (2017.01) |
| ***H04N 1/00*** | (2006.01) |

(52) U.S. Cl.

CPC ..... *G03G 15/5062* (2013.01); *G03G 15/5016* (2013.01); *G03G 15/55* (2013.01); *G06T 7/0004* (2013.01); *H04N 1/00031* (2013.01); *H04N 1/00074* (2013.01); *H04N 1/00082* (2013.01); *G06T 2207/10008* (2013.01); *G06T 2207/30144* (2013.01)

(58) Field of Classification Search

CPC ........... G03G 15/5016; G03G 15/5062; G03G 15/55; H04N 1/00029; H04N 1/00031; H04N 1/00074; H04N 1/00082; G06T 7/0004; G06T 2207/10008; G06T 2207/30144; G06F 3/1234

See application file for complete search history.

(56) References Cited

U.S. PATENT DOCUMENTS

| | | | | |
|---|---|---|---|---|
| 12,039,209 | B2 * | 7/2024 | Sakamoto | H04N 1/00029 |
| 12,537,903 | B2 * | 1/2026 | Imai | H04N 1/00029 |
| 2021/0365219 | A1 | 11/2021 | Hidaka | |
| 2022/0126601 | A1 * | 4/2022 | Mutsuno | G03G 15/5062 |
| 2025/0045519 | A1 * | 2/2025 | Gadiya | G06V 30/418 |
| 2025/0104218 | A1 * | 3/2025 | Aoyagi | H04N 1/00029 |

FOREIGN PATENT DOCUMENTS

| | | | |
|---|---|---|---|
| JP | 2021053819 | A | 4/2021 |
| JP | 2022174152 | A | 11/2022 |
| JP | 2024012209 | A | 1/2024 |

* cited by examiner

*Primary Examiner* — Sophia S Chen

(74) *Attorney, Agent, or Firm* — ROSSI, KIMMS & McDOWELL LLP

(57) ABSTRACT

Disclosed is an image forming system including an image forming unit configured to form an image on a sheet based on image data, a reader configured to read the image formed on the sheet, a setting unit configured to set inspection conditions for inspecting the image read by the reader, an inspector configured to execute an inspection of a reading result of the image read by the reader in accordance with the inspection conditions set by the setting unit, a display configured to display an inspection result obtained by the inspector, and a controller configured to control, in a case where the inspection result for a first sheet obtained by the inspector indicates an abnormality, the display to display a message for urging a user to check inspection settings.

25 Claims, 11 Drawing Sheets

IMAGE FORMING SYSTEM FOR INSPECTING A PRINTED IMAGE

BACKGROUND OF THE INVENTION

Field of the Invention

The present disclosure relates to an image forming system having a printing inspection function of performing a quality inspection of an image printed on a sheet.

Description of the Related Art

An image forming apparatus generates a printed matter by printing an image on a sheet based on image data representing an image to be printed. In particular, an image forming apparatus for use in a commercial printing site may print a large number of copies or a large number of pages at once. In US 2021/0365219 A1, there is disclosed a technology of executing test printing for printing only a specific page before main printing.

A printing inspection apparatus inspects whether or not an image printed on a sheet by an image forming apparatus has been formed as instructed by image data. In this inspection, image data is set as reference data, scan data obtained by reading an image printed on a sheet through use of a sensor such as a scanner is set as inspection image data, and the image data and the scan data are compared to each other. The printing inspection apparatus determines print quality of a printed matter based on the degree of agreement between the reference data and the inspection image data.

In the printing inspection apparatus, a printing inspection is executed in accordance with inspection settings, such as an inspection region and an inspection intensity, which are set in advance by the user. However, in a case where the items of the inspection settings that have been provided by the user are incorrect (different from those originally intended by the user), it may be determined that the inspection results indicate abnormalities (inspection NG). In this case, even when the printing is performed again in recovery printing, inspection NG occurs again, and hence there is a problem in that sheets are wastefully consumed.

In Japanese Patent Application Laid-open No. 2021-053819, for an inspection setting region set by the user, it is determined whether or not data read at the time of printing is blank. The data being blank refers to a case in which no image is formed in the inspection region. In a case where the data is blank, the user is notified of an error of the inspection settings. Further, in a case where the read data is not blank and, although a barcode image is formed in the inspection region, a read barcode cannot be decoded, there is a high possibility of printing failure, and thus recovery printing is performed.

SUMMARY OF THE INVENTION

An image forming system according to one embodiment of the present disclosure includes an image forming unit configured to form an image on a sheet based on image data, a reader configured to read the image formed on the sheet, a setting unit configured to set inspection conditions for inspecting the image read by the reader, an inspector configured to execute an inspection of a reading result of the image read by the reader in accordance with the inspection conditions set by the setting unit, a display configured to display an inspection result obtained by the inspector, and a controller configured to cause, in a case where the inspection result for a first sheet obtained by the inspector indicates an abnormality, the display to display a message for urging a user to check inspection settings.

An image forming system according to another embodiment of the present disclosure includes an image forming unit configured to form an image on a sheet based on image data, a reader configured to read the image formed on the sheet, a setting unit configured to set inspection conditions for inspecting the image read by the reader, an inspector configured to execute an inspection of a reading result of the image read by the reader in accordance with the inspection conditions set by the setting unit, a display configured to display an inspection result obtained by the inspector, and a controller configured to cause, in a case where the inspection result of an image formed as a first copy obtained by the inspector indicates an abnormality, the display to display a message for urging a user to check inspection settings.

An image forming system according to yet another embodiment of the present disclosure includes an image forming unit configured to form an image on a sheet based on image data, a reader configured to read the image formed on the sheet, a setting unit configured to set inspection conditions for inspecting the image read by the reader, an inspector configured to execute an inspection of a reading result of the image read by the reader in accordance with the inspection conditions set by the setting unit, a display configured to display an inspection result obtained by the inspector; and a controller configured to use the image forming unit to execute main printing in response to an instruction to execute the main printing and use the image forming unit to execute test printing in response to an instruction to execute the test printing, wherein the controller is configured to cause, in a case where the inspection result in a case in which the test printing has been performed indicates an abnormality, the display to display a message for urging a user to check inspection settings.

Further features of the present invention will become apparent from the following description of exemplary embodiments (with reference to the attached drawings).

DESCRIPTION OF THE EMBODIMENTS

Now, embodiments of the present disclosure are described with reference to the accompanying drawings. Unless otherwise specified, the following embodiments can be freely combined. Further, those embodiments and modification examples thereof do not limit the disclosure according to the appended claims, and not all combinations of features described in the embodiments are necessarily essential to solving means for the disclosure.

First Embodiment

<Configuration of Printing System>

Figure 1:
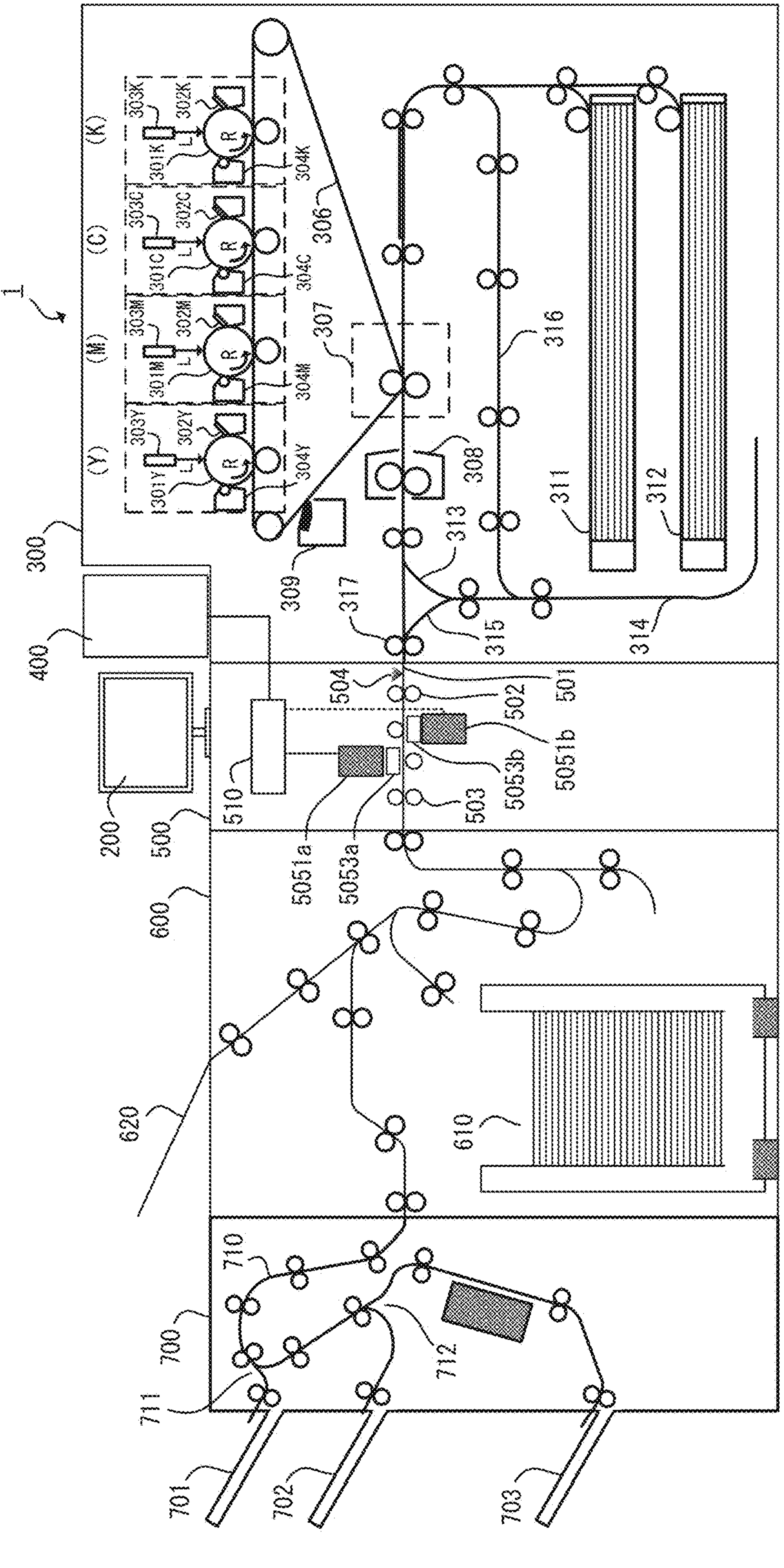
FIG. 1 is a configuration diagram of an image forming system.

FIG. 1 is a configuration diagram of an image forming system including a printing inspection apparatus according to a first embodiment of the present disclosure. An image forming system 1 includes an operating device 200, a printer 300 serving as an image forming unit, a controller 400, an inspection apparatus 500 serving as an image inspector, a stacker 600, and a finisher 700 serving as a post-processor. The operating device 200 is a user interface provided with an input interface and an output interface. The input interface is, for example, an input key and a touch panel. The output interface is, for example, a display and a speaker. Therefore, the operating device 200 functions as means for presenting information through vision and hearing. The operating device 200 transmits, to the controller 400, an instruction and data that have been input from the input interface. In addition, the operating device 200 outputs information from the output interface in response to an instruction received from the controller 400.

The controller 400 controls operations of the printer 300, the inspection apparatus 500, the stacker 600, and the finisher 700 based on instructions and data that have been input from the operating device 200 or instructions and data that have been acquired from an external apparatus through a network. For example, to perform image formation, the controller 400 transmits an instruction for the image formation to the printer 300. Details of the controller 400 are described later.

<Printer>

The printer 300 in the first embodiment is a color image forming apparatus that prints a color image on a sheet, and functions as printing means. The printer 300 includes image forming units Y, M, C, and K, an intermediate transfer member 306, a transfer unit 307, a fixing device 308, sheet feeding cassettes 311 and 312, and a feeding mechanism for the sheet. The image forming unit Y forms an image of yellow (Y). The image forming unit M forms an image of magenta (M). The image forming unit C forms an image of cyan (C). The image forming unit K forms an image of black (K). The images of the respective colors formed by the image forming units Y, M, C, and K are transferred onto the intermediate transfer member 306 in a superimposed manner. The transfer unit 307 transfers the image borne on the intermediate transfer member 306 onto the sheet. The fixing device 308 fixes, to the sheet, the image transferred onto the sheet. The respective image forming units Y, M, C, and K have the same configuration, and form the images by the same operation. The following description is directed to a configuration of the image forming unit Y, and descriptions of configurations of the image forming units M, C, and K are omitted.

The image forming unit Y includes a photosensitive drum 301Y, a charger 302Y, an exposure device 303Y, and a developing device 304Y. The photosensitive drum 301Y is a drum-shaped photosensitive member including a photosensitive layer on a surface thereof. During an operation, the photosensitive drum 301Y is rotated in a direction indicated by an arrow R about a drum axis. The charger 302Y uniformly charges the surface of the photosensitive drum 301Y being rotated. The exposure device 303Y acquires image data representing an image of yellow from the controller 400, and emits and outputs a laser beam L in accordance with the image data. The laser beam L output from the exposure device 303Y scans the charged surface of the photosensitive drum 301Y in a drum axis direction.

The laser light scans the surface of the photosensitive drum 301Y being rotated, to thereby form an electrostatic latent image corresponding to the image data of yellow on the surface of the photosensitive drum 301Y. The developing device 304Y stores a yellow developer (e.g., toner), and uses the developer to develop the electrostatic latent image formed on the photosensitive drum 301Y. Thus, a yellow image is formed on the surface of the photosensitive drum 301Y. The developing device 304Y is configured so that a developer can be constantly supplied thereto from a toner cartridge (not shown).

In the same manner, a magenta image is formed on a photosensitive drum 301M of the image forming unit M. A cyan image is formed on a photosensitive drum 301C of the image forming unit C. A black image is formed on a photosensitive drum 301K of the image forming unit K. The intermediate transfer member 306 is an endless belt member, and is rotated in a clockwise direction in FIG. 1. The intermediate transfer member 306 is in contact with the respective photosensitive drums 301Y, 301M, 301C, and 301K. In accordance with the rotation of the intermediate transfer member 306, the images of the respective colors are transferred from the respective photosensitive drums 301Y, 301M, 301C, and 301K in order so as to be superimposed one on another. Thus, a full-color image is formed on the intermediate transfer member 306. The intermediate transfer member 306 conveys the full-color image borne thereon to the transfer unit 307 by being rotated.

Sheets are stored in each of the sheet feeding cassettes 311 and 312, and are conveyed from the sheet feeding cassettes 311 and 312 to the transfer unit 307 by the feeding mechanism. A sheet is conveyed in accordance with a timing at which the image borne on the intermediate transfer member 306 is conveyed to the transfer unit 307. The transfer unit 307 transfers the image from the intermediate transfer member 306 onto the sheet. A cleaner 309 is arranged on a downstream side of the transfer unit 307 in a rotation direction of the intermediate transfer member 306. The cleaner 309 removes a developer remaining on the intermediate transfer member 306 after the transfer.

The sheet onto which the image has been transferred is conveyed from the transfer unit 307 to the fixing device 308. The fixing device 308 includes a heater and a pressure roller. The fixing device 308 uses heat from the heater and pressure from the pressure roller to melt the image and fix the image to the sheet.

Conveying paths 313, 314, and 315, a duplex conveying path 316, and discharge rollers 317 are provided on a downstream side of the fixing device 308 in a conveying direction of the sheet. The sheet that has passed through the fixing device 308 is temporarily conveyed from the conveying path 313 to the conveying path 314. After a trailing end of the sheet has passed through the conveying path 313, the conveying direction is reversed to convey the sheet from the conveying path 315 to the discharge rollers 317. With such conveyance, the sheet is discharged from the printer 300 by the discharge rollers 317 with an image-formed side facing downward (face down). A printed matter, which is the sheet that has been subjected to the image formation and discharged from the printer 300 by the discharge rollers 317, is passed over to the inspection apparatus 500.

In a case where duplex printing is to be performed on the sheet, the sheet conveyed to the conveying path 314 is conveyed to the duplex conveying path 316 after the trailing end has passed through the conveying path 313. The sheet is conveyed again to the transfer unit 307 through the duplex conveying path 316. Due to the passage through the duplex conveying path 316, a side of the sheet on which the image has been formed is turned over. The turned-over side of the sheet is subjected to image transferring processing by the transfer unit 307 and fixing processing by the fixing device 308, to thereby form an image on this side. The sheet having images formed on both sides is discharged as a printed matter from the printer 300 by the discharge rollers 317, and is passed over to the inspection apparatus 500.

<Printing Inspection Apparatus>

The inspection apparatus 500 includes a conveying path 501, an inspection controller 510, a first reader 5051*a*, a second reader 5051*b*, flow reading glasses 5053*a* and 5053*b*, conveying rollers 502 and 503 serving as conveying means, and a sheet detection sensor 504. Under the control of the controller 400, the inspection controller 510 controls the operation of the inspection apparatus 500. Details of the inspection controller 510 are described later. The first reader 5051*a* and the second reader 5051*b* are arranged at positions opposed to each other across the conveying path 501. The conveying rollers 502 and 503 convey the printed matter.

The inspection apparatus 500 detects the printed matter conveyed on the conveying path 501 by the sheet detection sensor 504, and the first reader 5051*a* and the second reader 5051*b* read the print images. The first reader 5051*a* and the second reader 5051*b* transmit reading results of the printed matter to the inspection controller 510. The inspection controller 510 performs a quality inspection of the images printed on the printed matter based on the reading results of the printed matter. The first reader 5051*a* and the second reader 5051*b* are arranged so as to be opposed to each other across the conveying path 501, and hence the images printed on both sides of the printed matter are read in one time of conveyance of the printed matter. The printed matter from which the images have been read is conveyed from the inspection apparatus 500 to the stacker 600.

<Stacker and Finisher>

The stacker 600 includes a large-capacity tray 610 and a purge tray 620. The stacker 600 discharges a printed matter to any one of the large-capacity tray 610, the finisher 700, and the purge tray 620 based on an instruction received from the controller 400 and the results of the quality inspection performed by the inspection controller 510.

The finisher 700 includes a printed matter conveyor 710 including a plurality of conveying rollers and conveying paths, an upper-stage delivery tray 701, a middle-stage delivery tray 702, and a lower-stage delivery tray 703. The printed matter conveyor 710 includes switching mechanisms 711 and 712 for switching a discharge destination of the printed matter. The finisher 700 takes in printed matters from the stacker 600 in order, and discharges each of the printed matters to any one of the upper-stage delivery tray 701, the middle-stage delivery tray 702, and the lower-stage delivery tray 703 in response to an instruction received from the controller 400. The finisher 700 may be configured to perform post-processing, such as staple processing for binding and stapling a plurality of printed matters, bookbinding processing for the bound printed matters, and cut-off processing for the bound printed matters.

<Controller>

Figure 2:
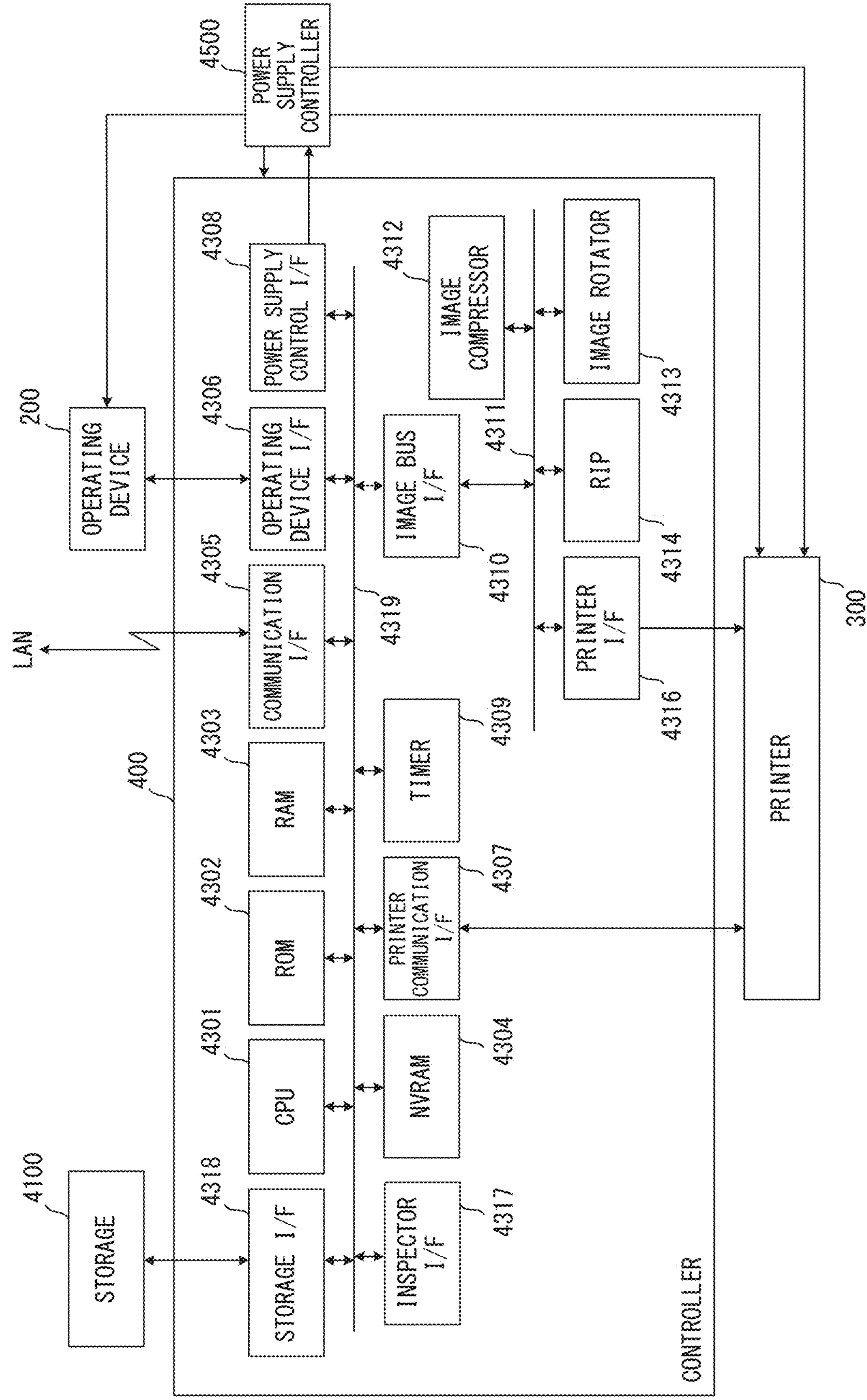
FIG. 2 is a configuration diagram of a controller.

FIG. 2 is an explanatory diagram of a configuration of the controller 400. In addition to the printer 300, the inspection apparatus 500, and the operating device 200, the controller 400 is connected to a storage 4100 and a power supply controller 4500. The storage 4100 is a large-capacity storage device, such as a hard disk drive (HDD) or a solid state drive (SSD). As interfaces with the respective components to be connected, the controller 400 includes a storage I/F 4318, an operating device I/F 4306, a power supply control I/F 4308, an inspector I/F 4317, a printer communication I/F 4307, and a printer I/F 4316. The controller 400 also includes a communication I/F 4305 for communicating to/from an external apparatus through the network. The storage I/F 4318, the operating device I/F 4306, the power supply control I/F 4308, the inspector I/F 4317, the printer communication I/F 4307, and the communication I/F 4305 are connected to a system bus 4319.

The controller 400 includes a central processing unit (CPU) 4301, a read only memory (ROM) 4302, and a random access memory (RAM) 4303. The CPU 4301 executes a computer program stored in the ROM 4302 to control an operation of the image forming system 1. The RAM 4303 provides a work area for the CPU 4301 to execute processing. The RAM 4303 is also used as an image memory for temporarily storing image data and the like. The CPU 4301, the ROM 4302, and the RAM 4303 are also connected to the system bus 4319. A non-volatile RAM (NVRAM) 4304 and a timer 4309 are also connected to the system bus 4319. The NVRAM 4304 stores various parameters for control. The timer 4309 holds a current time, and monitors passage of a set time period.

The operating device I/F 4306 controls communication to/from the operating device 200. The operating device I/F 4306 receives input of print jobs, commands, and printing settings, which is performed from the operating device 200 to the controller 400, and transmits the input information to the CPU 4301. Under the control of the CPU 4301, the operating device I/F 4306 displays various screens and states of the image forming system 1 on a display of the operating device 200. Under the control of the CPU 4301, the printer communication I/F 4307 controls communication to/from the printer 300. The power supply control I/F 4308 instructs the power supply controller 4500 to supply or stop various kinds of electric power in accordance with a command received from the CPU 4301. The power supply controller 4500 supplies electric power to the printer 300. Under the control of the CPU 4301, the inspector I/F 4317 controls communication to/from the inspection apparatus 500. Under the control of the CPU 4301, the storage I/F 4318 controls communication to/from the storage 4100.

The communication I/F 4305 is connected to a network such as a local area network (LAN), and performs communication control, such as transmission and reception of an email and inputting and outputting of PDL data from an external apparatus. The communication I/F 4305 also includes an NVRAM (not shown), and holds various parameters relating to communication control, such as a MAC address.

The system bus 4319 is connected to an image bus 4311 through an image bus I/F 4310. The image bus I/F 4310 is a bridge that connects the system bus 4319 and an image bus 4311 for transferring image data to the printer 300 to each other. A printer I/F 4316, an image compressor 4312, an image rotator 4313, and a raster image processor (RIP) 4314 are connected to the image bus 4311.

The image compressor 4312 performs compression and decompression processing for JPEG, JBIG, MMR, MH, and the like. The image rotator 4313 performs image rotation processing. The RIP 4314 expands PDL code into a bitmap raster image. The printer I/F 4316 transmits image data to the printer 300. This image data is generated by the controller 400 subjecting image data for print output to image processing for the printer 300, such as correction for the printer 300 and resolution conversion.

<Inspection Controller>

Figure 3:
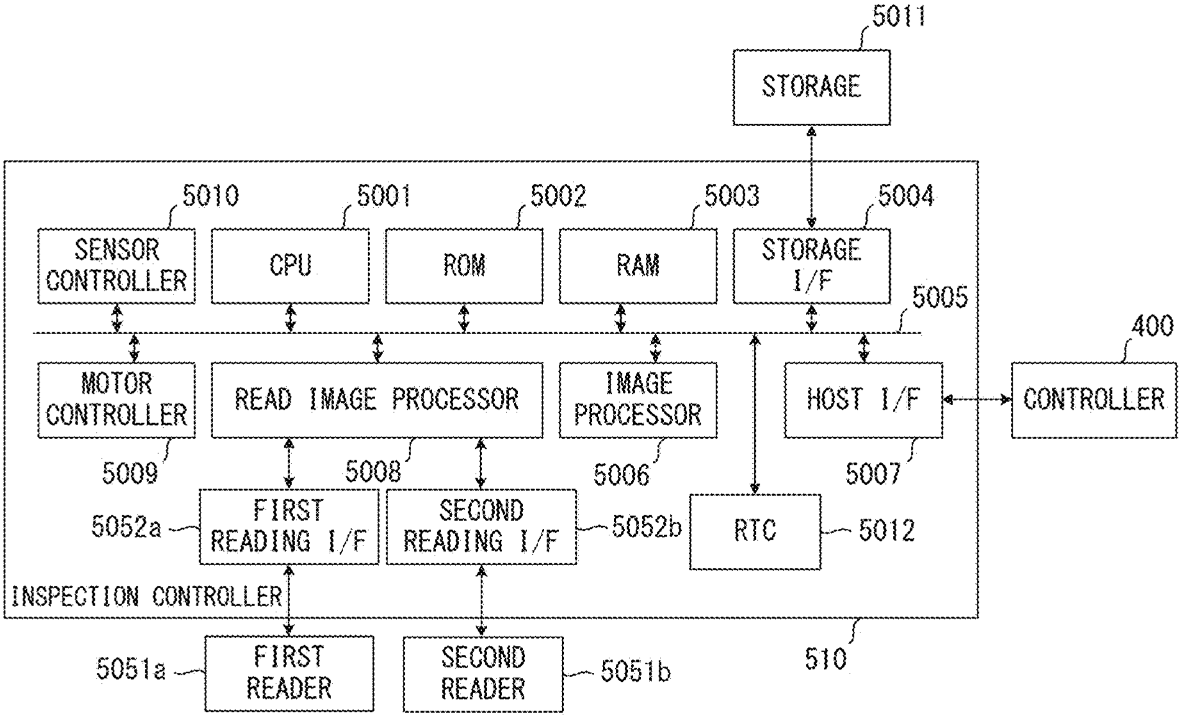
FIG. 3 is a configuration diagram of an inspection controller.

FIG. 3 is an explanatory diagram of a configuration of the inspection controller 510 provided to the inspection apparatus 500. The inspection controller 510 controls operations of the first reader 5051*a* and the second reader 5051*b*. The inspection controller 510 performs processing, such as analysis of the reading results from the first reader 5051*a* and the second reader 5051*b*, operation control of the inspection apparatus 500, and communication to/from the controller 400. The inspection controller 510 is also connected to a storage 5011, which is storage means for storing a misregistration correction profile and the like, and the controller 400.

The inspection controller 510 includes a CPU 5001, a ROM 5002, a RAM 5003, a storage I/F 5004, a motor controller 5009, a read image processor 5008, an image processor 5006, an RTC 5012, a host I/F 5007, and a sensor controller 5010. The respective components are connected to a system bus 5005. The read image processor 5008 is connected to the first reader 5051*a* through a first reading I/F 5052*a*, and is connected to the second reader 5051*b* through a second reading I/F 5052*b*. The RTC 5012 is a real-time clock, and holds the current time with high accuracy.

The host I/F 5007 controls communication to/from the inspector I/F 4317 of the controller 400. In a case where the inspection controller 510 and the controller 400 communicate to/from each other, data is transmitted and received between the host I/F 5007 and the inspector I/F 4317. For example, the host I/F 5007 acquires image data used for an image forming operation of the printer 300 from the controller 400. The storage 5011 is a large-capacity storage device, such as an HDD or an SSD. The image data can be stored in any location, but is stored in the storage 5011 in the first embodiment.

The CPU 5001 executes a computer program stored in the ROM 5002 to control the operation of the inspection apparatus 500. The RAM 5003 provides a work area for the CPU 5001 to execute processing. The storage I/F 5004 controls communication to/from the storage 5011 connected to the inspection controller 510.

The read image processor 5008 is controlled by the CPU 5001 to acquire the reading result of the image on the printed matter from the first reader 5051*a* through the first reading I/F 5052*a*. The read image processor 5008 is also controlled by the CPU 5001 to acquire the reading result of the image on the printed matter from the second reader 5051*b* through the second reading I/F 5052*b*. Under the control of the CPU 5001, the read image processor 5008 performs magnification processing, gamma correction processing, and the like on the reading results (read data) of the images on the printed matter, which have been acquired from the first reader 5051*a* and the second reader 5051*b*, to generate read image data, and stores the read image data in the RAM 5003. The first reader 5051*a* and the second reader 5051*b* are each provided with a sensor array, and are each capable of reading an entire region of the printed matter conveyed on the conveying path 501. The first reader 5051*a* reads an image on a first side of a printed matter, and the second reader 5051*b* reads an image on a second side of the printed matter.

The first reader 5051*a* and the second reader 5051*b* are each formed of a light emitter and a light receiver. The light emitter is formed of, for example, a white light emitting diode (LED), and the light receiver is formed of, for example, a CMOS sensor equipped with an RGB color filter. The light emitter is controlled by the CPU 5001 to irradiate the printed matter being conveyed along the conveying path 501 with light. The light receiver receives the light reflected by the printed matter by separating the light into three color components of RGB through use of a color filter, and outputs read data as a light reception result (reading result). The read data is transmitted to the read image processor 5008.

Under the control of the CPU 5001, the motor controller 5009 controls operations of various motors provided in the inspection apparatus 500. Under the control of the CPU 5001, the sensor controller 5010 controls the operations of various sensors provided in the inspection apparatus 500, and notifies the CPU 5001 of detection results from the sensors. The image processor 5006 is controlled by the CPU 5001 to compare the image data stored in the storage 5011 (hereinafter referred to as "reference image data") to the read image data stored in the RAM 5003, to thereby perform a quality inspection of the printed matter. The reference image data is image data to be used by the printer 300 forming an image, and is stored in the storage 5011. In another case, the reference image data may be an image obtained by reading a reference image in advance before the quality inspection is performed. During the comparison, the image processor 5006 subjects the reference image data to correction processing using a parameter based on calibration described later.

<Printing Settings>

Figure 4:
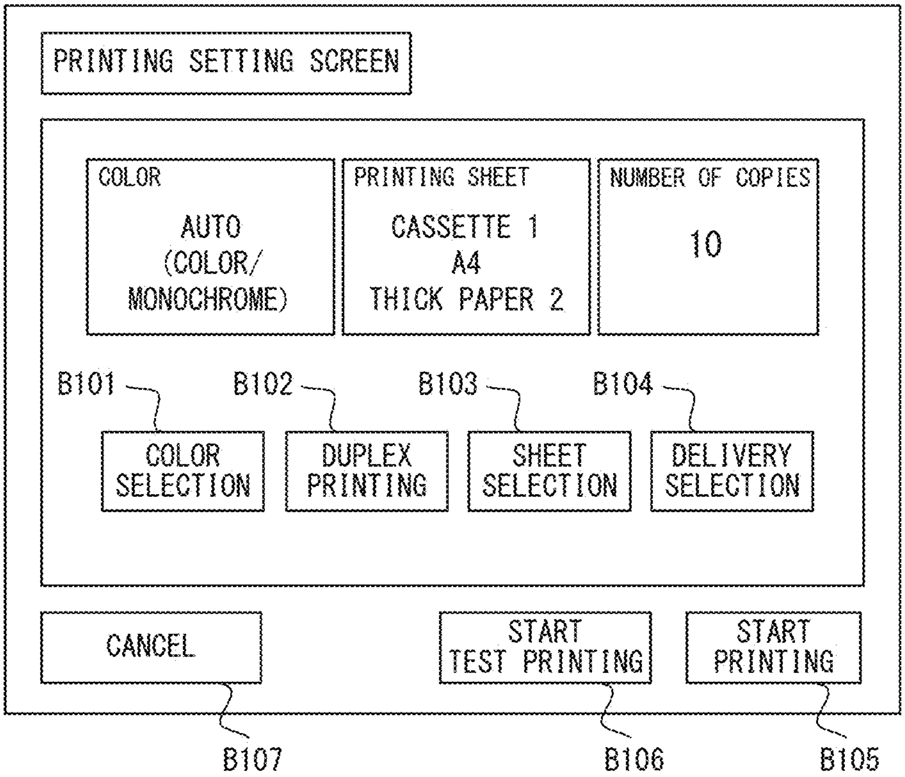
FIG. 4 is an explanatory view of an operation screen.

FIG. 4 is an explanatory view of an operation screen displayed on the display of the operating device 200 in order to instruct the printer 300 to perform printing. The operation screen functions as an information presentation screen for presenting information such as printing settings. This operation screen further functions as reception means for receiving an operation from the user such as printing start. A user causes the printer 300 to execute printing through use of such an operation screen displayed on the display. FIG. 4 indicates a state in which selection of color or monochrome is set to automatic selection, a cassette 1 is selected as a cassette for use, A4 is selected as a sheet size, thick paper 2 is selected as a type of paper, and 10 copies are selected as the number of copies to be printed. A button B101 to a button B104 are buttons for providing respective printing settings. The button B101 is a button for selecting the color (color or monochrome) for printing, and the button B102 is a button for selecting a printing side (simplex printing or duplex printing). The button B103 is a sheet selection button for selecting a type of sheet, and the button B104 is a delivery selection button for setting, for example, the discharge destination of the printed matter. In addition, the number of copies to be printed can be set through use of a numeric keypad (not shown). A button B105 is a printing start button which functions as first reception means, and in a case where the button B105 is pressed, printing is started with the printing settings provided by the button B101 to the button B104 and the number of copies set by the numeric keypad, that is, main printing is started. A button B106 is a test printing start button which functions as second reception means, and in a case where the button B106 is pressed, only one copy of the first page is printed with the printing settings provided by the button B101 to the button B104. A button B107 is a cancel button, and in a case where the button is pressed, the settings that have been input by the user are canceled, and an initial screen (not shown) is displayed on the display of the operating device 200.

In the first embodiment and a second embodiment of the present disclosure, not printing pages to be printed the number of which is specified through the operation screen as they are but printing some of the pages (for example, only one page) is described as test printing, and printing the pages the number of which is designated is described as main printing. However, even when all pages are to be printed, a case of printing fewer copies than a specified plurality of number of copies to be printed (for example, printing only one copy in a case where a plurality of copies are required) in order to check a printing result, for example, may also be included in the "test printing." Further, performing printing with the number of pages or the number of copies different from the designated number of pages or the designated number of copies for some purpose such as checking the printing result may be included in the "test printing."

The image processor 5006 of the inspection apparatus 500 executes the inspection of the printed matter in accordance with inspection settings provided in advance. The central processing unit (CPU) 4301 of the controller 400 functions as control means. Irrespective of which of the button B105 and the button B106 is pressed, the CPU 4301 controls the printer 300 to print an image on a sheet, and controls the inspection apparatus 500 to execute the inspection of the printed matter in accordance with the inspection settings provided in advance. In a case where the button B107 is pressed, the settings that have been input are canceled as described above.

The printing setting screen illustrated in FIG. 4 may display, for example, a check box in a selectable manner. The check box is provided to select whether or not to execute an inspection. For example, the user (operator) touches the check box on the operation screen to place a checkmark in the check box and further remove a checkmark from the check box. In a case where the button B105 (or B106) is pressed under a state in which the checkmark is placed in the check box described above, the CPU 4301 controls the printer 300 to print an image on a sheet, and controls the inspection apparatus 500 to execute the inspection of the printed matter (image printed on the sheet). Meanwhile, in a case where the button B105 (or B106) is pressed under a state in which no checkmark is placed in the check box described above, the CPU 4301 controls the printer 300 to print an image on a sheet without executing the inspection by the inspection apparatus 500.

<Inspection Settings>

Figure 5:
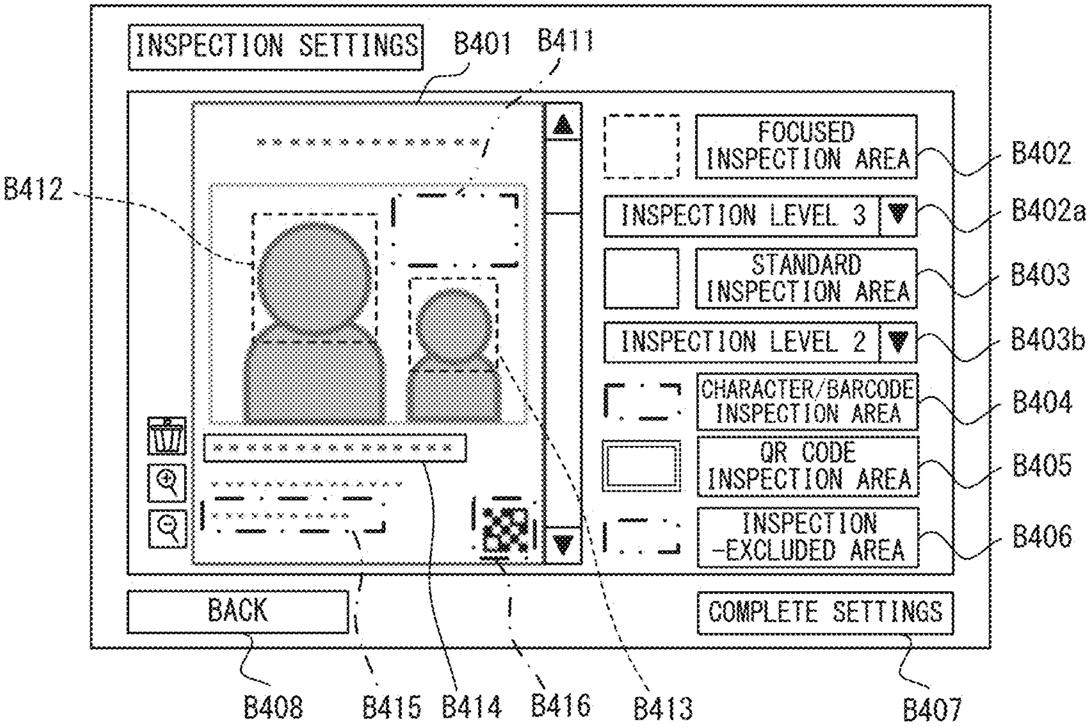
FIG. 5 is an explanatory view of an inspection setting screen.

FIG. 5 is an explanatory view of an inspection setting screen for providing the inspection settings of the inspection apparatus 500. The inspection settings include inspection conditions. In FIG. 5, the inspection settings include a plurality of setting items which each affect the determination of whether or not the inspection result indicates an abnormality. Specifically, the inspection settings include a focused inspection area, a standard inspection area, a character/barcode inspection area, a QR code (trademark) inspection area, and an inspection-excluded area to be described later. The inspection setting screen has a function serving as reception means for receiving an instruction from the user for setting an inspection area in which an inspection such as a quality inspection is to be executed by the inspection apparatus 500. In FIG. 5, an area B401 is a printed-image and inspection-setting-area display portion, and the inspection area can be freely set through use of a mouse, a touch panel, or the like. In this example, an original image in a print job is displayed in the area B401, and an area B411 to an area B416 are illustrated as inspection areas. The area B401 and the area B411 to the area B416 are each a rectangular region, but any shape, such as a triangle, a polygon, or a circle, may be able to be designated in accordance with a shape of an area to be inspected.

A button B402 to a button B406 are buttons for setting an inspection area type. The user can set the inspection area by setting a region in the area B401 with one of the button B402 to the button B406 being selected. In FIG. 5, four types of buttons are illustrated for setting the inspection area type. The button B402 is a focused inspection area setting button for setting an area in which a highly accurate inspection is to be performed, and the button B403 is a standard inspection area setting button for setting an overall inspection level. In addition, the button B404 is a detailed setting button for providing detailed settings regarding a variable inspection area that is an area in which a variable inspection is to be performed. The variable inspection area is an area within the entire print image in which data to be changed for each page, each copy, or each sheet or variable data is embedded, and, for example, a number, a barcode, or the like that differs for each sheet is formed in the variable inspection area. It can be determined whether or not there is an abnormality in the image based on whether or not the information indicated by a reading result of the variable inspection area has consistency that follows a predetermined rule, for example, an ascending order or a descending order of numbers. The example of FIG. 5 shows a state in which a character/barcode inspection area has been selected as the variable inspection area. Therefore, in this example, the button B404 is a character/barcode inspection area setting button. A button B405 is a QR code inspection area setting button. A button B406 is an inspection-excluded area setting button for designating an area in which an inspection is not to be performed.

In the example of FIG. 5, an inspection level setting button for setting an inspection level in terms of inspection accuracy stepwise, for example, from a level 1 to a level 5, may be provided for each inspection area. Specifically, in FIG. 5, a button B402*a* is provided as an inspection level setting button for the button B402 that is the focused inspection area. In addition, a button B403*b* is provided as an inspection level setting button for the button B403 that is the standard inspection area. This allows the user to set the inspection level for each of the focused inspection area of the button B402 and the standard inspection area of the button B403. In the example of FIG. 5, an inspection level 1 has the lowest inspection accuracy, and the inspection accuracy increases as an inspection level number increases. In FIG. 5, an inspection level 3 is set as the inspection level for the focused inspection area, and an inspection level 2 is set as the inspection level for the standard inspection area. In FIG. 5, the inspection level can be set for each of the buttons B402 and B403, but the inspection level may be allowed to be set similarly for the buttons B404 to B406.

A button B407 is a setting completion button, and in a case where the user selects and presses this button, the inspection settings are completed. A button B408 is a button for returning to the previous screen, and in a case where the user selects this button, inspection setting processing is canceled to return to an initial screen (not shown). In addition, a dotted-line rectangle is shown on the left side of the button B402, and it is visually shown that the focused inspection area is represented by a dotted-line rectangle. In the same manner, a solid-line rectangle is shown on the left side of the button B403, and it is shown that the standard inspection area is represented by a solid-line rectangle. A one-dot-chain-line rectangle is shown on the left side of the button B404, and it is shown that the character/barcode inspection area is represented by a one-dot-chain-line rectangle. A double-line rectangle is shown on the left side of the button B405 being the setting button for the QR code inspection area, and it is shown that the QR code inspection area is represented by a double-line rectangle. A two-dot-chain-line rectangle is shown on the left side of the button B406 for setting the inspection-excluded area, and it is shown that the inspection-excluded area is represented by a two-dot-chain-line rectangle within the area B401.

For example, the user can freely select an area to be subjected to a focused inspection by selecting the button B402 and selecting, through use of a mouse or the like, an area within the area B401 in which a focused inspection is required to be performed. In the example of FIG. 5, the areas B412 and B413, which are areas including human faces, are both represented by dotted-line rectangles, and those areas are shown as the focused inspection areas set by the button B402. The area B414 is represented by a solid-line rectangle, and is shown as the standard inspection area set by the button B403. The area B415 is represented by a one-dot-chain-line rectangle, and is shown as the character/barcode inspection area set by the button B404. The area B416 is represented by a double-line rectangle, and is shown as the QR code inspection area set by the button B405. The area B411, which is a background region and is not required to be subjected to a highly accurate inspection, is represented by a two-dot-chain-line rectangle, and is shown as the inspection-excluded area set by the button B406.

Compared to a case of inspecting an entire image, only required areas can be selected to be inspected, to thereby be able to reduce resources required for the inspection, for example, a use amount of the RAM 5003 of the inspection apparatus 500 and a load and throughput for processing performed on the CPU 5001. In addition, through setting of the inspection level stepwise, for example, from the level 1 to the level 5, resources of an image forming apparatus required for the inspection can be reduced compared to a case of constantly performing the inspection at a high level of inspection accuracy. Further, through setting of a plurality of areas and setting of the inspection level for each of the areas, the resources can be optimally allocated in accordance with the required level of inspection accuracy.

<Printing Inspection During Test Printing>

The test printing is performed to check whether or not the print image, the printing settings of the printer 300, and the inspection settings of the inspection apparatus 500 are correct. For example, a print image includes a character string, and the user may wish to inspect whether or not the printed character string is correct through use of the inspection apparatus 500. In this case, it is required to set a region (hereinafter referred to as "inspection region") in which the inspection apparatus 500 performs optical character recognition (OCR) processing to identify the character string.

However, in a case where the inspection region is incorrect, the character string cannot be identified, and an inspection result indicates an abnormality (inspection NG). In a case where inspection NG occurs in the main printing, recovery printing is normally executed, but inspection NG repeatedly occurs in a case where there is a setting error. This leads to wasteful paper consumption and an increase in apparatus downtime. In the first embodiment, at the time of execution of the test printing, in a case where the inspection NG has occurred, no recovery printing is executed, and a screen for urging the user to check the inspection settings is displayed on the operating device 200.

Figure 6A:
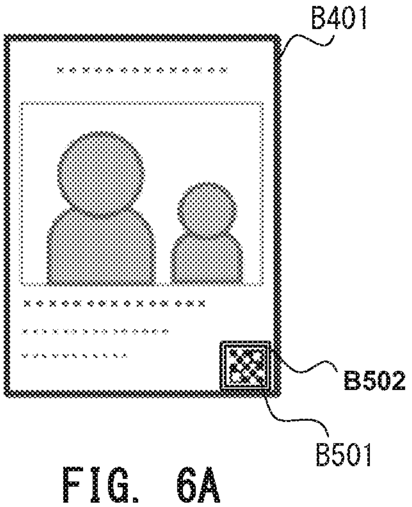
FIG. 6A, FIG. 6B, and FIG. 6C are each an explanatory view of an inspecting setting error example.
Figure 6B:
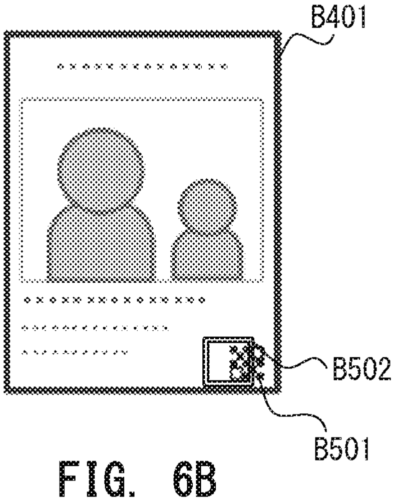
Figure 6C:
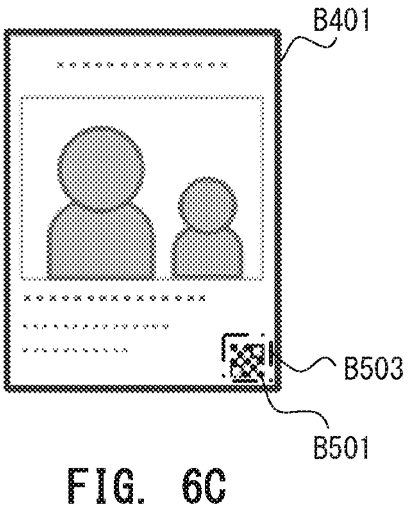

FIG. 6A to FIG. 6C are each an explanatory view of the inspection settings. FIG. 6A shows an example in which the inspection settings are correct. In FIG. 6A, a QR code (trademark) B501 is provided in the area B401 serving as a printed-image and inspection-setting-area display portion. Further, the area B502 is provided such that the QR code B501 is positioned in its internal region, and functions as the QR code inspection region. As illustrated in FIG. 6A, the area B502 is represented by a double-line rectangle, and is set as the QR code inspection area. In the example of FIG. 6A, the area B502 is arranged such that the entire QR code B501 is included in its internal region, and the area B502 is set as the QR code inspection area in which the QR code (trademark) can be read. Thus, in this example, a correct inspection suitable for reading the QR code can be performed.

FIG. 6B is an example showing an inspection setting error of inspection setting region misalignment. In this example, for the QR code B501, although the area B502 is set as the QR code inspection region, the position of the area B502 is misaligned, and a part of the QR code B501 protrudes to the outside of the area B502. Accordingly, at the time of execution of the inspection, a part of the QR code cannot be read, and thus inspection NG occurs.

FIG. 6C is an example showing an inspection setting error in an inspection setting type. In this example, the area B503 is arranged such that the entire QR code B501 is included in its internal region. However, the area B503 is represented by a one-dot-chain-line rectangle. A one-dot-chain-line rectangle is shown on the left side of the button B404, and the character/barcode inspection area is set as a barcode inspection region. In addition, the area B416 (barcode inspection region) is set for the QR code B501, and hence inspection NG occurs at the time of execution of the inspection.

In a case where the inspection NG occurs in the first sheet of test printing, there is assumed a case in which the inspection setting region is misaligned from an inspection target range as illustrated in FIG. 6B or a case in which there is a setting error of the inspection setting type as illustrated in FIG. 6C. In addition, because it is highly possible that the inspection settings are inappropriate as described above, a screen for urging the user to check the inspection settings is displayed on the operating device 200.

<Description of Operation Screen of Operating Device at Time of Execution of Inspection>

Figure 7A:
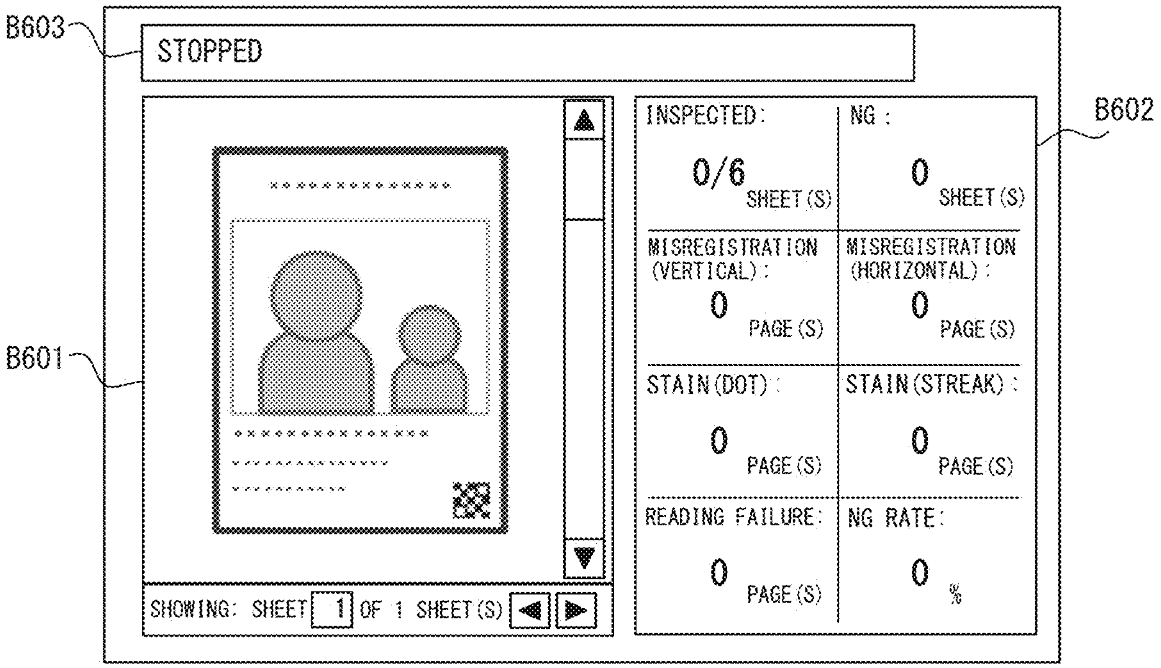
FIG. 7A and FIG. 7B are each an explanatory view of the operation screen at the time of execution of an inspection.
Figure 7B:
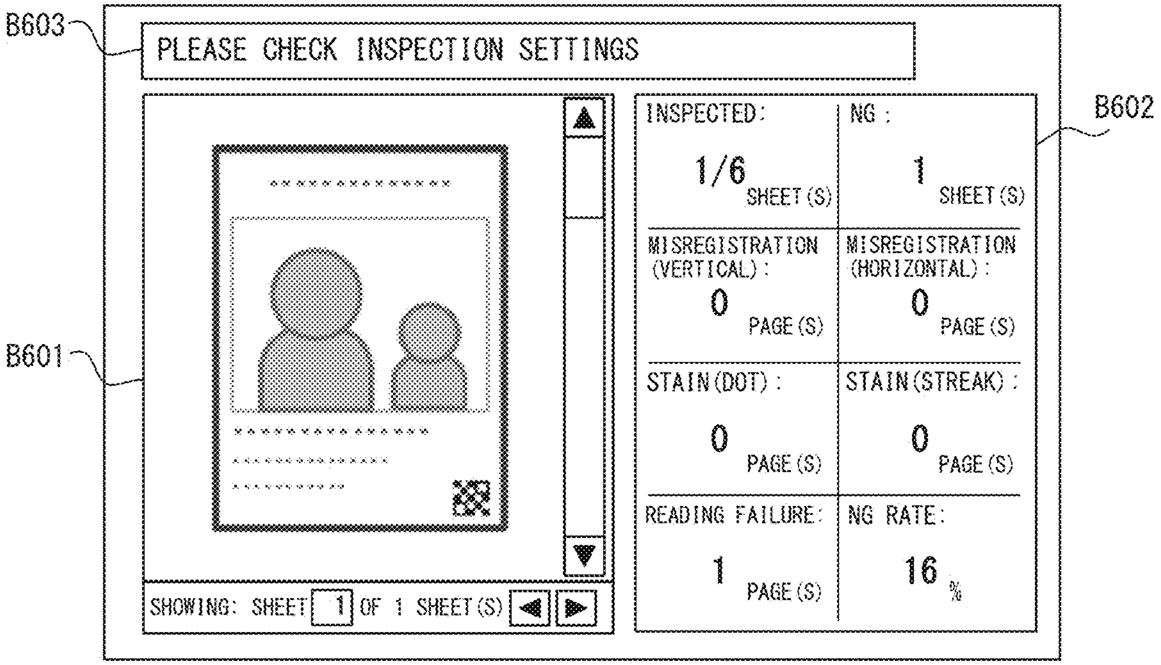

FIG. 7A and FIG. 7B are each an explanatory view for illustrating display items of the operation screen at the time of execution of the inspection. In this case, the operation screen functions as an inspection screen. In FIG. 7A and FIG. 7B, an area B601 is an area for displaying a read image. An area B602 is an area for displaying inspection statuses, such as a completed inspection count, an inspection NG count, an inspection NG rate, and a type of NG. An area B603 is an area for displaying a status, such as waiting, inspecting, or inspection completed. In a case where the printer 300 does not execute printing, as illustrated in FIG. 7A, a message of "STOPPED" indicating that the inspection is temporarily stopped is displayed in the area B603. Meanwhile, as described above, in a case where the inspection NG has occurred in the first sheet of the test printing, it is highly possible that the inspection settings are inappropriate. Accordingly, as illustrated in FIG. 7B, a message of "PLEASE CHECK INSPECTION SETTINGS" is displayed in the area B603 in order to urge the user to check the inspection settings.

As described above, the user can easily check whether there is an error in the inspection settings or whether there is a high possibility of an apparatus abnormality during the test printing by checking the item described in the status display region of the area B603 of the inspection screen at the time of execution of the inspection.

<Printing Inspection Processing Flow>

Figure 8:
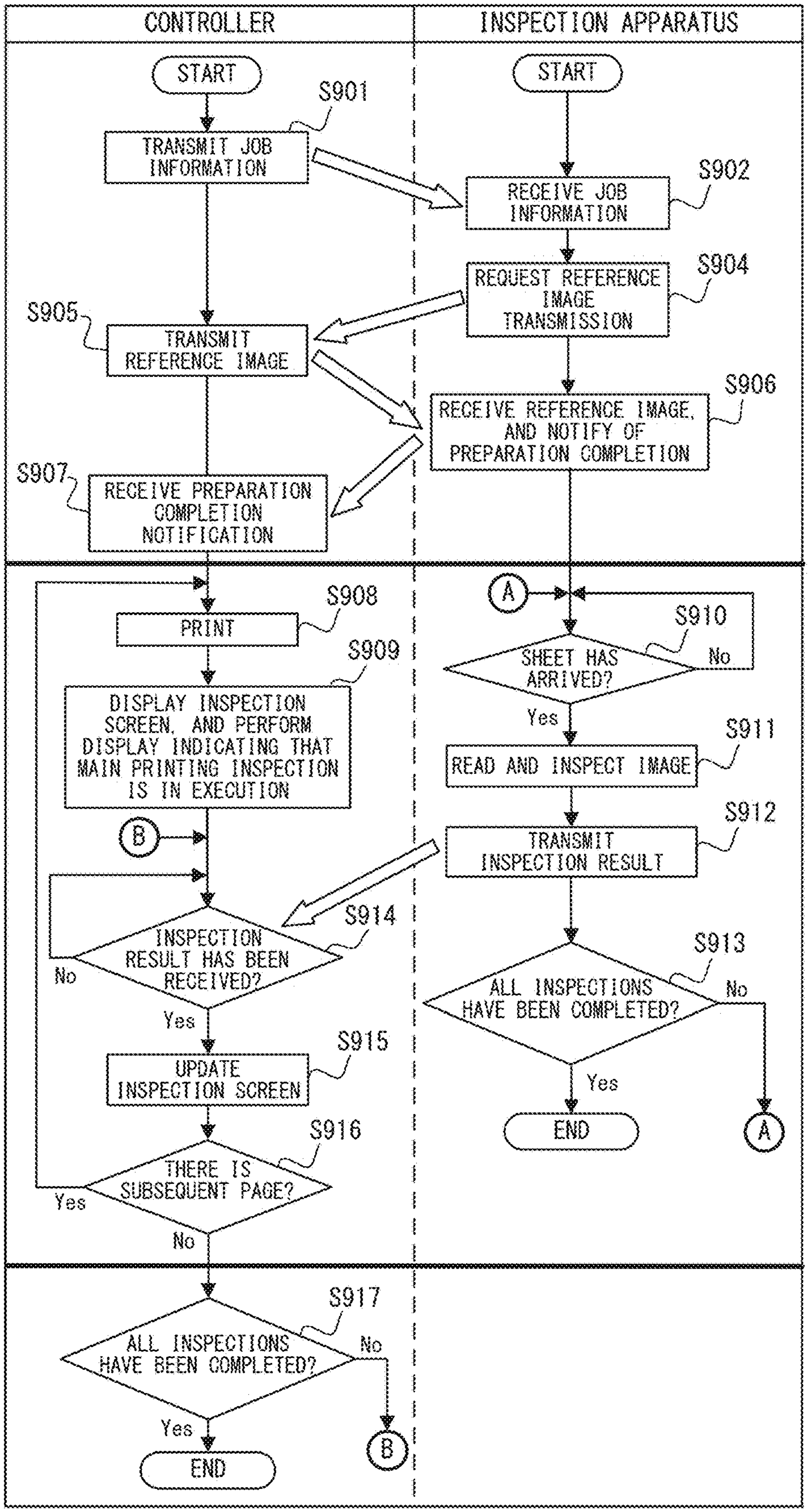
FIG. 8 is a flow chart of main printing inspection processing.

FIG. 8 is a flow chart of main printing. In this flow chart, processing to be executed by the CPU 4301 of the controller 400 and processing to be executed by the CPU 5001 of the inspection apparatus 500 are collectively illustrated. In FIG. 4, in a case where the user presses the printing start button (button B105), the CPU 4301 is instructed to execute the main printing, and the main printing inspection processing is executed in accordance with the instruction.

In a case where the button B105 is selected through the operating device 200, the CPU 4301 of the controller 400 transmits, to the inspection apparatus 500, job information including, for example, sheet information for use in printing, inspection settings, and a discharge destination (Step S901). The CPU 5001 of the inspection apparatus 500 receives the job information from the controller 400 (Step S902). After having received the job information from the controller 400, the CPU 5001 of the inspection apparatus 500 transmits, to the controller 400, a reference image transmission request for inspection determination (Step S904).

The CPU 4301 of the controller 400 transmits original image data of the print job as reference image data to the inspection apparatus 500 based on the reference image transmission request received from the inspection apparatus 500 (Step S905). The CPU 5001 of the inspection apparatus 500 receives the reference image from the controller 400 to store the reference image in the storage 5011, and notifies the controller 400 of completion of preparation for the print job (Step S906).

In a case where the CPU 4301 of the controller 400 receives a preparation completion notification from the inspection apparatus 500 (Step S907), the CPU 4301 controls the printer 300 to start the printing (Step S908). After that, the CPU 4301 controls the operating device 200 to cause the display to display an inspection screen, and displays a message indicating that the printed matter of the main printing is to be inspected on the inspection screen (Step S909). For example, this message is displayed in the area B603 of the inspection screen. The method of displaying the message is not limited to this example. For example, the CPU 4301 may display a message indicating that the main printing inspection is to be started on the inspection screen in a case where the preparation completion notification is received from the inspection apparatus 500, and may display a message indicating that the main printing inspection is in execution after a lapse of a predetermined time period. In this case, until the above-mentioned predetermined time period has elapsed, a cancel button for the inspection may be displayed on the screen together with the display indicating that the main printing inspection is to be started, and the user may be allowed to cancel the main printing inspection by pressing this cancel button.

After the execution of Step S906, the CPU 5001 of the inspection apparatus 500 determines whether or not a sheet has arrived at the sheet detection sensor 504 on the conveying path 501 of the inspection apparatus 500 (Step S910). In a case where a sheet has not arrived (No in Step S910), the CPU 5001 of the inspection apparatus 500 waits for a sheet to arrive. In a case where a sheet has arrived (Yes in Step S910), the CPU 5001 of the inspection apparatus 500 reads the sent sheet by the first reader 5051*a* and the second reader 5051*b*, and instructs the image processor 5006 to perform processing for comparison to the reference image data received in Step S906. Accordingly, the image processor 5006 performs the processing for comparison to perform an image inspection (Step S911).

The CPU 5001 of the inspection apparatus 500 transmits an inspection result of the image inspection based on the comparison performed by the image processor 5006 to the controller 400 (Step S912), and determines whether all inspections have been completed (Step S913). In a case where the inspections have not been completed (No in Step S913), the CPU 5001 of the inspection apparatus 500 returns the process to the processing step of Step S910 again. In a case where the inspections have been completed (Yes in Step S913), the CPU 5001 of the inspection apparatus 500 ends the processing. Meanwhile, the CPU 4301 of the controller 400 determines whether or not the inspection result has been received (Step S914). In a case where the inspection result has not been received (No in Step S914), the CPU 4301 waits for reception of the inspection result, and in a case where the inspection result has been received (Yes in Step S914), the CPU 4301 controls the operating device 200 to update the inspection screen based on the inspection result (Step S915).

After that, the controller 400 determines whether or not there is a page subsequent to the current page (Step S916), and in a case where there is a subsequent page (Yes in Step S916), the controller 400 and the inspection apparatus 500 repeat the processing steps of from Step S908 to Step S916 again. In a case where there is no subsequent page (No in Step S916), the CPU 4301 of the controller 400 determines whether a final page of the job has been processed and the printing and inspection of all pages have been completed (Step S917). In a case where the inspections have not been completed (No in Step S917), the CPU 4301 of the controller 400 executes Step S914 again. In a case where the inspections have been completed (Yes in Step S917), the CPU 4301 of the controller 400 controls the operating device 200 to perform display indicating that the inspections have been completed on the inspection screen, and ends the processing. Thus, the main printing inspection processing is ended.

<Test Printing Inspection Processing Flow>

Figure 9:
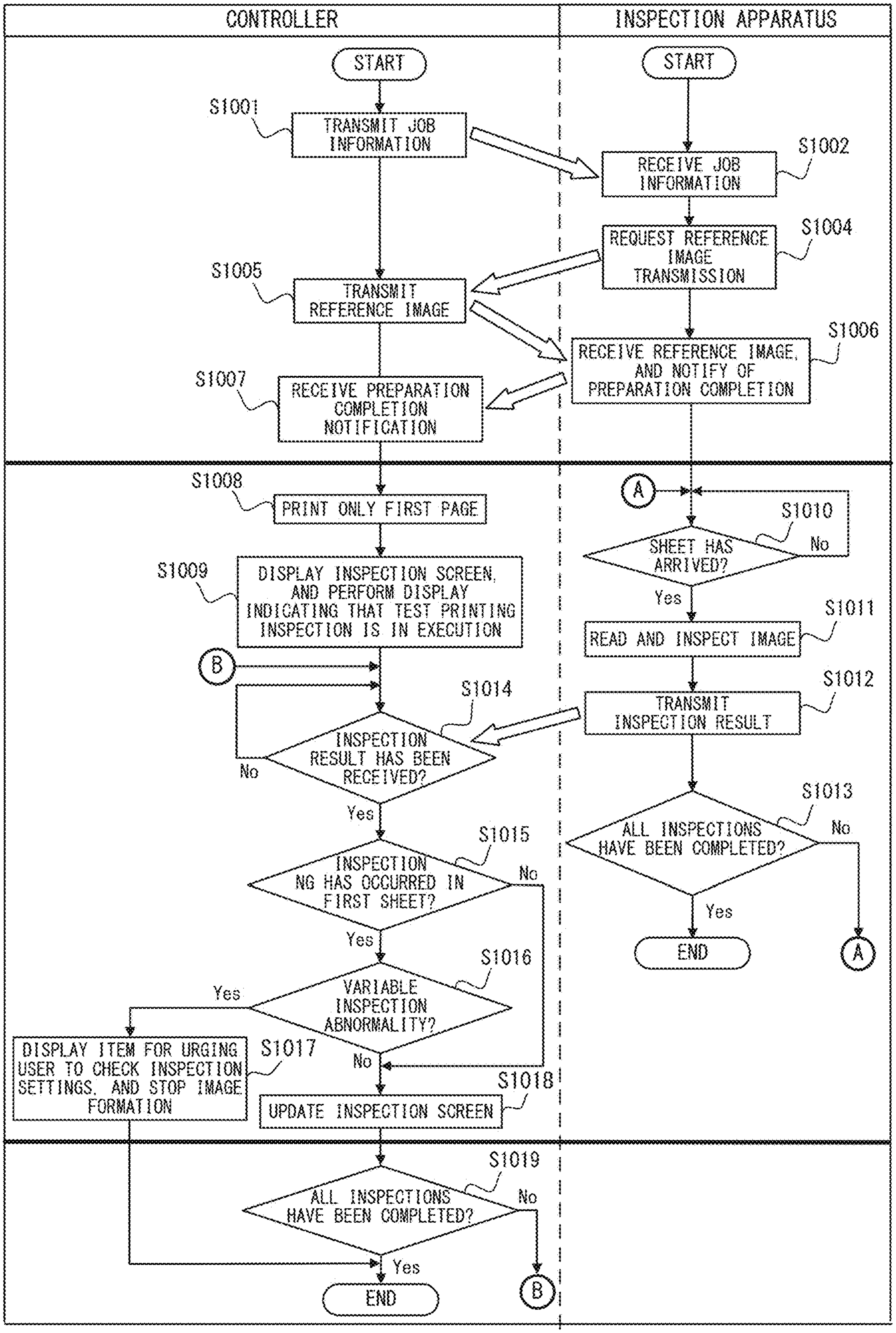
FIG. 9 is a flow chart of test printing inspection processing.

FIG. 9 is a flow chart of test printing inspection processing. In this control, processing to be executed by the CPU 4301 of the controller 400 and processing to be executed by the CPU 5001 of the inspection apparatus 500 are collectively illustrated. In FIG. 4, in a case where the user presses the test printing start button (button B106), the CPU 4301 is instructed to execute the test printing, and the test printing inspection processing is executed in accordance with the instruction. In any of the first embodiment and the second embodiment to be described later, in a case where an inspection of test printing is performed, an image is printed only on the first page. However, for example, in a case where the plurality of copies are to be printed, only one of the plurality of copies may be printed as test printing. Further, in a case where a plurality of copies are instructed as the number of copies to be printed and the execution of test printing is instructed, the user may be able to instruct whether to print one of the plurality of copies or print only the first page as the test printing through the setting screen. In another mode, in a case where a plurality of copies are instructed as the number of copies to be printed and the execution of test printing is instructed, the CPU 4301 may determine to print one of the plurality of copies as the test printing. In further another mode, in a case where a plurality of copies are instructed as the number of copies to be printed and the execution of test printing is instructed, the CPU 4301 may determine to print only the first page as the test printing. In a case where a plurality of pages are included in one copy, an image is printed on each of the plurality of sheets. Then, each of the images formed on the plurality of sheets is inspected. Further, in any of the first embodiment and the second embodiment, in a case where the test printing is executed on a plurality of sheets, information including a cause of the inspection result is displayed in accordance with how many sheets from the first sheet in test printing the sheet for which the inspection result in the inspection is determined as having an abnormality corresponds to. In particular, the first embodiment shows an example in which it is determined that the inspection result indicates an abnormality (inspection NG) in the first sheet in test printing.

In a case where the button B106 is selected and pressed by the user through the operating device 200, the CPU 4301 of the controller 400 transmits, to the inspection apparatus 500, job information including sheet information for use in printing, inspection settings, and a discharge destination (Step S1001). The CPU 5001 of the inspection apparatus 500 receives the job information from the controller 400 (Step S1002). After having received the job information from the controller 400, the CPU 5001 of the inspection apparatus 500 transmits, to the controller 400, a reference image transmission request for inspection determination (Step S1004).

The CPU 4301 of the controller 400 transmits original image data of the print job as reference image data to the inspection apparatus 500 based on the reference image transmission request received from the inspection apparatus 500 (Step S1005). The CPU 5001 of the inspection apparatus 500 receives the reference image from the controller 400 to store the reference image in the storage 5011, and notifies the controller 400 of completion of preparation for the print job (Step S1006).

In a case where the CPU 4301 of the controller 400 receives a preparation completion notification from the inspection apparatus 500 (Step S1007), the CPU 4301 controls the printer 300 to start the printing of only the first page (Step S1008). After that, the CPU 4301 controls the operating device 200 to display an inspection screen, and performs display indicating that the test printing inspection is in execution on the inspection screen (Step S1009). For example, this display is performed in the area B603 of the inspection screen. The display method is not limited to this example. For example, the CPU 4301 may perform display indicating that the test printing inspection is to be started on the inspection screen in a case where the preparation completion notification is received from the inspection apparatus 500, and may perform display indicating that the test printing inspection is in execution after a lapse of a predetermined time period. In this case, until the above-mentioned predetermined time period has elapsed, a cancel button for the test printing inspection may be displayed on the screen together with the display indicating that the test printing inspection is to be started, and the user may be allowed to cancel the test printing inspection by pressing this cancel button.

After the execution of Step S1006, the CPU 5001 of the inspection apparatus 500 determines whether or not a sheet has arrived at a sheet detection position of the sheet detection sensor 504 on the conveying path 501 of the inspection apparatus 500 (Step S1010). In a case where a sheet has not arrived (No in Step S1010), the CPU 5001 of the inspection apparatus 500 waits for a sheet to arrive. In a case where a sheet has arrived (Yes in Step S1010), the CPU 5001 of the inspection apparatus 500 sequentially reads the sent sheet by the first reader 5051*a* and the second reader 5051*b*. The CPU 5001 then instructs the image processor 5006 to perform processing for comparison to the reference image data received in Step S1006. Accordingly, the image processor 5006 performs the processing for comparison to perform an image inspection (Step S1011).

The CPU 5001 of the inspection apparatus 500 transmits an inspection result of the image inspection based on the comparison performed by the image processor 5006 to the controller 400 (Step S1012). The CPU 5001 determines whether all inspections have been completed or not (Step S1013). If completed (Yes in Step S1013), the CPU ends the processing. If not completed (No in Step S1013), the CPU 5001 performs Step S1010. On the other hand, after the S1012 has processed by the CPU 5001, the CPU 4301 of the controller 400 determines whether or not the inspection result has been received (Step S1014). In a case where the inspection result has not been received (No in Step S1014), the CPU 4301 waits for reception of the inspection result. In a case where the inspection result has been received (Yes in Step S1014), the CPU 4301 advances the process to Step S1015 to determine whether or not inspection NG has occurred in the first sheet (Step S1015).

In a case where the inspection NG has occurred in the first sheet (Yes in Step S1015), the CPU 4301 determines whether or not the inspection NG indicates an abnormality relating to a variable inspection (Step S1016). In a case where the inspection NG indicates the abnormality relating to the variable inspection (Yes in Step S1016), the CPU 4301 controls the operating device 200 to display an item for urging the user to check the inspection settings on the inspection screen (Step S1017) and further stops the image formation to end the processing. In a case where the inspection NG has not occurred (No in Step S1015), the CPU 4301 controls the operating device 200 to update the inspection screen based on the inspection result (Step S1018). After that, the CPU 4301 determines whether all of the inspections have been completed (Step S1019), and in a case where all of the inspections have not been completed (No in Step S1019), the CPU 4301 returns the process to the processing step of Step S1014. In this manner, the CPU 4301 repeats the processing steps of from Step S1014 to Step S1017 until all images set in the test printing are formed on the sheet. In a case where all of the inspections have been completed (Yes in Step S1019), the CPU 4301 of the controller 400 controls the operating device 200 to perform display indicating that the inspections have been completed on the inspection screen, and ends the processing.

Further, when, in Step S1016, the inspection NG indicates an abnormality other than that relating to the variable inspection (No in Step S1016), the CPU 4301 advances the process to Step S1018. Step S1018 and the subsequent processing steps are performed in accordance with the flow described above. Thus, the test printing inspection processing is ended.

As the cause of inspection NG, there is a tendency that the number of cases in which a human error is the cause is larger than the number of cases in which machine failure is the cause. Therefore, in the first embodiment, in a case where the inspection NG occurs in the first sheet, as the information including the cause (inspection settings) of the abnormality in the inspection result, an item for urging the user to check the inspection settings provided by the user is displayed on the display of the operating device 200.

The CPU 4301 may be configured to determine, in a case where the inspection settings are NG in the first sheet (Yes in Step S1015), whether or not the inspection settings include a variable inspection, and in a case where the variable inspection is included, display a message for urging the user to check the inspection settings on the inspection screen.

Second Embodiment

Now, the second embodiment of the present disclosure is described with reference to the accompanying drawing. In the second embodiment, all the apparatus components are the same as those in the first embodiment, and the second embodiment differs from the first embodiment only in the display of the operating device screen based on the inspection result in the test printing inspection and the corresponding processing flow. Therefore, in the second embodiment described below, only the differences from the first embodiment are described.

<Printing Inspection in Test Printing>

In a case where the inspection NG has occurred in the second or subsequent sheets in the test printing, the first sheet is determined as inspection OK, and hence the possibility that the inspection settings have an abnormality is low. Accordingly, an item for urging the user to check whether the apparatus is inappropriate is given as a notification through the operating device 200.

<Description of Inspection Execution Screen of Operating Device 200>

Figure 10:
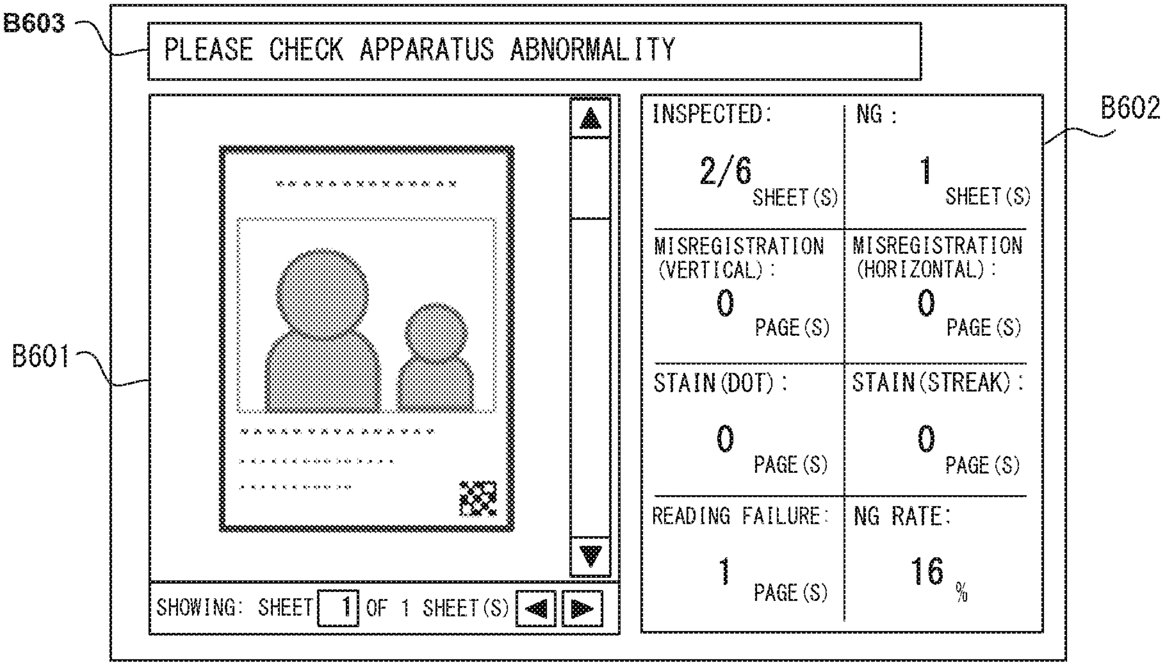
FIG. 10 is an explanatory view of an operation screen at the time of execution of an inspection in a second embodiment of the present disclosure.

FIG. 10 is a view for illustrating an operating device screen after execution of an inspection in the second embodiment. As described above, in a case where the inspection NG has occurred in the second or subsequent sheets in the test printing, the possibility that the inspection settings are inappropriate is low, and hence, as illustrated in FIG. 10, display of "PLEASE CHECK APPARATUS ABNORMALITY," which is the item for urging the user to check the apparatus abnormality, is given as a notification through the operating device 200.

<Test Printing Inspection Processing Flow>

Figure 11:
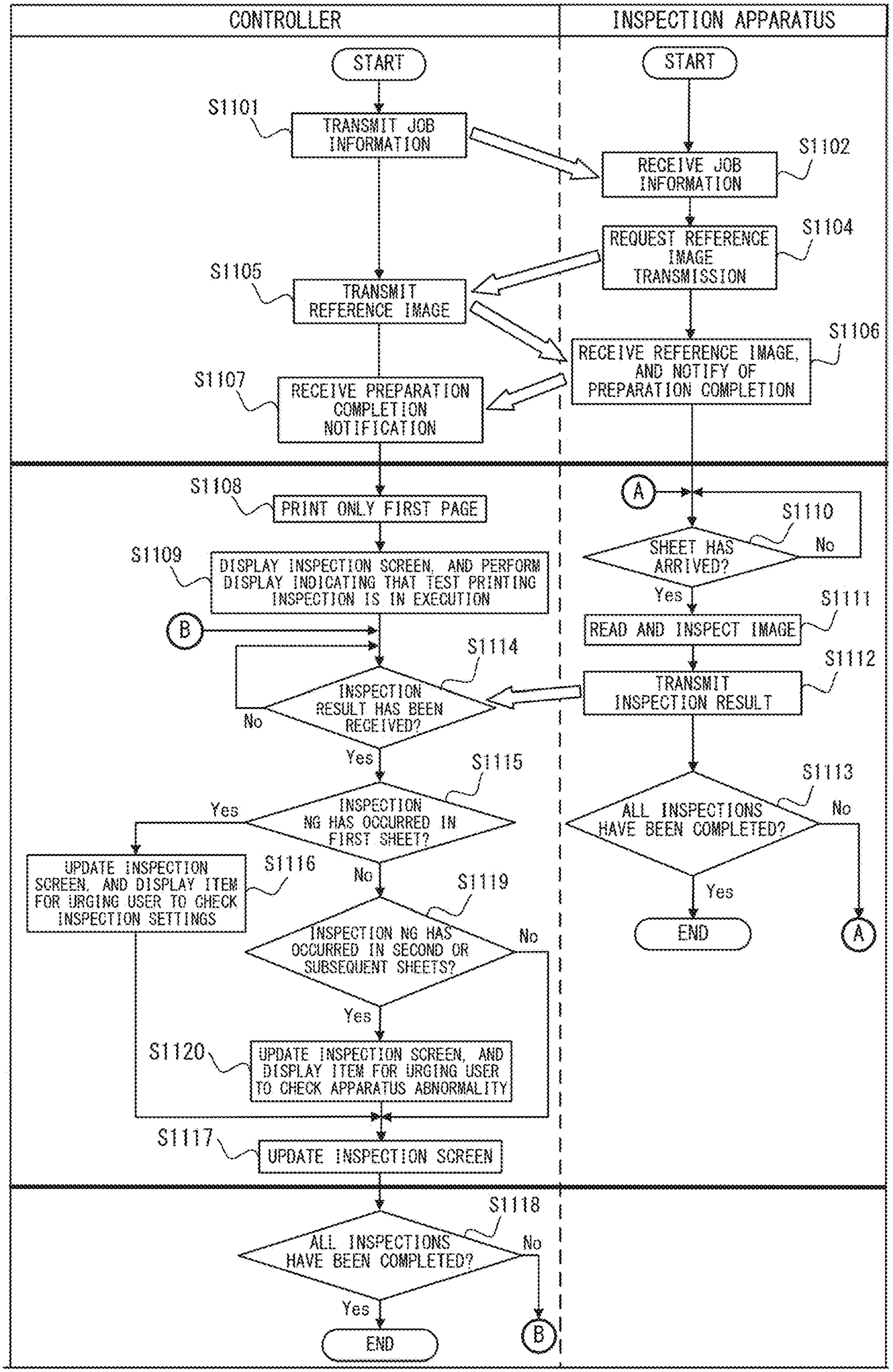
FIG. 11 is a flow chart of test printing inspection processing in the second embodiment.

FIG. 11 is a flow chart of test printing inspection processing. In this flow chart, processing to be executed by the CPU 4301 of the controller 400 and processing to be executed by the CPU 5001 of the inspection apparatus 500 are collectively illustrated. In FIG. 4, in a case where the user selects and presses the button B106, which is the test printing start button, the CPU 4301 is instructed to execute the test printing, and the test printing inspection processing is executed in accordance with the instruction. In FIG. 11, the processing steps of from Step S1101 to Step S1114 are the same as the details of the respective processing steps of from Step S1001 to Step S1014 in the first embodiment, and hence description thereof is omitted.

After the execution of Step S1114, the CPU 4301 of the controller 400 determines whether the inspection NG has occurred in the first sheet (Step S1115). In a case where the inspection NG has occurred in the first sheet (Yes in Step S1115), similarly to the first embodiment, the CPU 4301 of the controller 400 controls the operating device 200 to display an item for urging the user to check the inspection settings on the inspection screen (Step S1116), and executes the processing step of Step S1117 to be described later. In a case where the inspection NG has not occurred in the first sheet (No in Step S1115), the CPU 4301 of the controller 400 determines whether the inspection NG has occurred in the second or subsequent sheets (Step S1119).

As described above, in a case where a plurality of sheets are to be inspected, the inspection settings, for examples, settings of the inspection level and the arrangement of the regions are common in any sheet to be printed. In a case where the inspection result is not NG (No in Step S1119), the CPU 4301 of the controller 400 executes the processing step of Step S1117 to be described later. In a case where the inspection result is NG (Yes in Step S1119), the CPU 4301 of the controller 400 controls the operating device 200 to display an item for urging the user to check the apparatus abnormality on the inspection screen (Step S1120), and controls the operating device 200 to update the inspection screen based on the inspection result (Step S1117). After that, the CPU 4301 of the controller 400 controls the operating device 200 to perform display indicating that the inspections have been completed on the inspection screen (Step S1118). Thus, the test printing inspection processing is ended.

As described above, as the cause of the inspection NG, because of a human error, the possibility that there is an error in the inspection settings provided by the user tends to be high. However, as described with reference to FIG. 5, the inspection settings are common in any original, and hence the inspection NG in the second or subsequent sheets means presence of an original that has passed the inspection before the original having the inspection NG. From this fact, in a case where the inspection NG has occurred in the second or subsequent sheets in Step S1119, it is inferred that there is a low possibility of occurrence of the inspection setting region misalignment illustrated in FIG. 6B or the inspection setting error in the inspection type illustrated in FIG. 6C. Therefore, in the second embodiment, as the information including the cause (apparatus abnormality) of the abnormality in the inspection result, an item for urging the user to check the apparatus abnormality is displayed on the display of the operating device 200. In this manner, as the cause of the inspection NG, a more appropriate cause can be provided as guidance.

Third Embodiment

In the image forming apparatus in the first embodiment, in a case where the inspection result of the first sheet in the test printing indicates inspection NG, an item for urging the user to check the inspection settings is displayed on the inspection screen, but the following control may be performed in a case where the main printing is executed without performing the test printing. In the flow chart of FIG. 12, the processing steps of from Step S1001 to Step S1007, from Step S1010 to Step S1014, and Step S1018 and Step S1019 are similar to the processing steps in the flow chart of FIG. 9, and description thereof is omitted. Further, the processing steps of Step S1008 and Step S1009 in FIG. 9 are not executed in the flow chart of FIG. 12.

Figure 12:
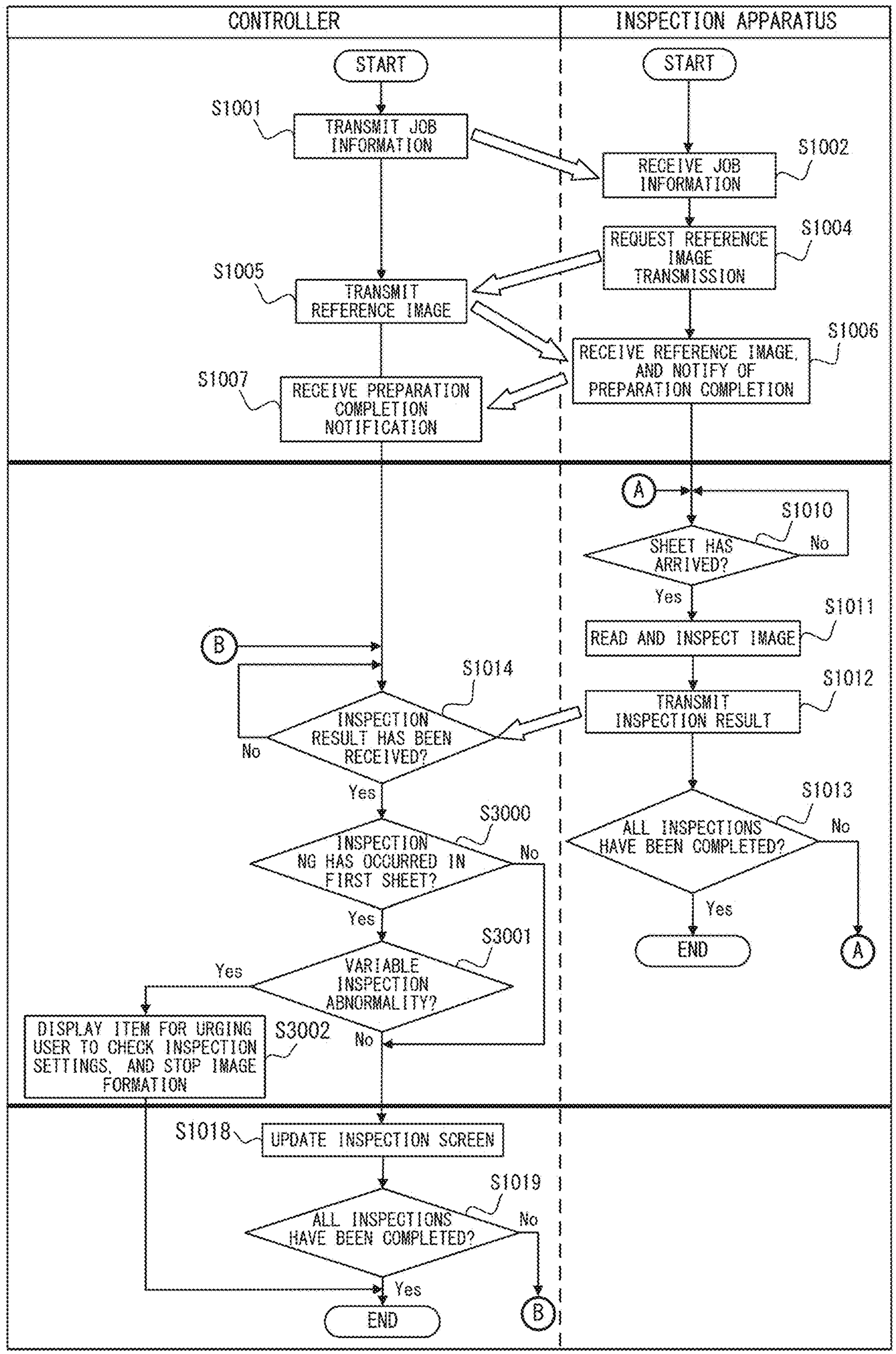
FIG. 12 is a flow chart of test printing inspection processing in a third embodiment of the present disclosure.

Therefore, in a third embodiment of the present disclosure, as illustrated in FIG. 12, in a case where the inspection result has been received in Step S1014 (Yes in Step S1014), the main printing is executed without performing the test printing. In a case where the inspection NG has occurred in the first sheet (Yes in Step S3000), the CPU 4301 determines whether or not the inspection NG indicates an abnormality relating to a variable inspection (Step S3001). In a case where the inspection NG indicates the abnormality relating to the variable inspection (Yes in Step S3001), the CPU 4301 controls the operating device 200 to display an item for urging the user to check the inspection settings on the inspection screen (Step S3002) and further stops the image formation to end the processing. In a case where the inspection NG has not occurred (No in Step S3000), the CPU 4301 executes Step S1018 and the subsequent processing steps.

As described above, according to the third embodiment of the present disclosure, it is possible to check whether or not there is an error in the inspection settings by the test printing that is executed before the main printing. Accordingly, it is possible to prevent NG paper from being caused by the printing inspection resulting in NG due to an error in the inspection settings in the main printing. In addition, it is possible to prevent occurrence of a rework of reviewing the inspection settings after the main printing.

Further, it is considered that, depending on the type or the like of the image forming apparatus, there are other causes having a high possibility of being causes of occurrence of inspection NG in the inspection of the first sheet among the causes of inspection NG. In this case, in Step S1016 of FIG. 9, the other causes having a high possibility of being causes of occurrence of inspection NG in the inspection of the first sheet among the causes of inspection NG may be displayed. The items of the checking of the inspection settings and the checking of the apparatus abnormality are visually displayed. However, in place of the visual display, the items thereof can be presented by a voice (hearing), a vibration pattern (touch), or the like corresponding to the checking of the inspection settings or the apparatus abnormality.

In the recovery printing, the inspection NG may occur again even when the recovery printing is performed because there is a high possibility of printing failure. In this case, the user is required to separate the causes into an error in the inspection settings or occurrence of printing failure, leading to an increase in man-hours of the user's work.

According to the present disclosure, the cause of the abnormality in the inspection result can be appropriately presented to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-041488, filed Mar. 15, 2024, which is hereby incorporated by reference herein in its entirety.

What is claimed is:

1. An image forming system comprising:
- an image forming unit configured to form an image on a sheet based on image data;
- a reader configured to read the image formed on the sheet;
- a setting unit configured to set inspection conditions for inspecting the image read by the reader;
- an inspector configured to execute an inspection of a reading result of the image read by the reader in accordance with the inspection conditions set by the setting unit;
- a display configured to display an inspection result obtained by the inspector; and
- a controller configured to control, in a case where the inspection result for a first sheet obtained by the inspector indicates an abnormality, the display to display a message for urging a user to check inspection settings.

2. The image forming system according to claim 1,
- wherein the setting unit is operable to set a variable inspection for controlling the inspector to inspect a region in the image formed on the sheet, the region being changed for each sheet, and
- wherein the controller is configured to control, in a case where the inspection result for the first sheet obtained by the inspector indicates an abnormality relating to the variable inspection, the display to display a message for urging the user to check the inspection settings.

3. The image forming system according to claim 1,
- wherein the setting unit is operable to set a variable inspection for controlling the inspector to inspect a region in the image formed on the sheet, the region being changed for each sheet, and
- wherein the controller is configured to control, in a case where the inspection result for the first sheet obtained by the inspector indicates an abnormality and the variable inspection is set by the setting unit, the display to display a message for urging the user to check the inspection settings.

4. The image forming system according to claim 1, further comprising a receiver configured to receive an instruction to execute test printing,
- wherein the controller is configured to control, in a case where the inspection result for the first sheet in the test printing executed in response to the instruction indicates an abnormality, the display to display a message for urging the user to check the inspection settings.

5. The image forming system according to claim 4, wherein the controller is configured to control, in a case where the test printing is to be executed and the inspection result is determined as having an abnormality in second or subsequent sheets, the display to display a message for urging the user to check an apparatus abnormality.

6. The image forming system according to claim 4, wherein the test printing involves printing a part of a page to be printed.

7. The image forming system according to claim 4, wherein the controller is configured to control the display to present which of printing which is the test printing and printing other than the test printing is executed.

8. The image forming system according to claim 1, wherein the image forming unit is configured to stop image formation in a case where the inspection result for the first sheet obtained by the inspector indicates an abnormality.

9. The image forming system according to claim 1, wherein the inspection conditions include a plurality of setting items which each affect determination of whether the inspection result indicates an abnormality.

10. An image forming system comprising:
- an image forming unit configured to form an image on a sheet based on image data;
- a reader configured to read the image formed on the sheet;
- a setting unit configured to set inspection conditions for inspecting the image read by the reader;
- an inspector configured to execute an inspection of a reading result of the image read by the reader in accordance with the inspection conditions set by the setting unit;
- a display configured to display an inspection result obtained by the inspector; and
- a controller configured to control, in a case where the inspection result of an image formed as a first copy obtained by the inspector indicates an abnormality, the display to display a message for urging a user to check inspection settings.

11. The image forming system according to claim 10,
- wherein the setting unit is operable to set a variable inspection for controlling the inspector to inspect a region in the image formed on the sheet, the region being changed for each sheet, and wherein the controller is configured to control, in a case where the inspection result of the image formed as a first copy obtained by the inspector indicates an abnormality relating to the variable inspection, the display to display a message for urging the user to check the inspection settings.

12. The image forming system according to claim 10, wherein the setting unit is operable to set a variable inspection for controlling the inspector to inspect a region in the image formed on the sheet, the region being changed for each sheet, and wherein the controller is configured to control, in a case where the inspection result of the image formed as a first copy obtained by the inspector indicates an abnormality and the variable inspection is set by the setting unit, the display to display a message for urging the user to check the inspection settings.

13. The image forming system according to claim 10, further comprising a receiver configured to receive an instruction to execute test printing, wherein the controller is configured to control, in a case where the inspection result of the image formed as a first copy in the test printing executed in response to the instruction indicates an abnormality, the display to display a message for urging the user to check the inspection settings.

14. The image forming system according to claim 13, wherein the controller is configured to control, in a case where the test printing is to be executed and the inspection result is determined as having an abnormality in the image formed as second or subsequent copy, the display to display a message for urging the user to check an apparatus abnormality.

15. The image forming system according to claim 13, wherein the test printing involves printing a part of a page to be printed.

16. The image forming system according to claim 13, wherein the controller is configured to control the display to present which of printing which is the test printing and printing other than the test printing is executed.

17. The image forming system according to claim 10, wherein the image forming unit is configured to stop image formation in a case where the inspection result of the image formed as a first copy obtained by the inspector indicates an abnormality.

18. The image forming system according to claim 10, wherein the inspection conditions include a plurality of setting items which each affect determination of whether the inspection result indicates an abnormality.

19. An image forming system comprising:

an image forming unit configured to form an image on a sheet based on image data;

a reader configured to read the image formed on the sheet;

a setting unit configured to set inspection conditions for inspecting the image read by the reader;

an inspector configured to execute an inspection of a reading result of the image read by the reader in accordance with the inspection conditions set by the setting unit;

a display configured to display an inspection result obtained by the inspector; and a controller configured to use the image forming unit to execute main printing in response to an instruction to execute the main printing and use the image forming unit to execute test printing in response to an instruction to execute the test printing, wherein the controller is configured to control, in a case where the inspection result in a case in which the test printing has been performed indicates an abnormality, the display to display a message for urging a user to check inspection settings.

20. The image forming system according to claim 19, wherein the setting unit is operable to set a variable inspection for controlling the inspector to inspect a region in the image formed on the sheet, the region being changed for each sheet, and wherein the controller is configured to control, in a case where the inspection result in the case in which the test printing has been performed obtained by the inspector indicates an abnormality relating to the variable inspection, the display to display a message for urging the user to check the inspection settings.

21. The image forming system according to claim 19, wherein the setting unit is operable to set a variable inspection for controlling the inspector to inspect a region in the image formed on the sheet, the region being changed for each sheet, and wherein the controller is configured to control, in a case where the inspection result in the case in which the test printing has been performed obtained by the inspector indicates an abnormality and the variable inspection is set by the setting unit, the display to display a message for urging the user to check the inspection settings.

22. The image forming system according to claim 19, wherein the image forming unit is configured to stop image formation in a case where the inspection result in the case in which the test printing has been performed obtained by the inspector indicates an abnormality.

23. The image forming system according to claim 19, wherein the inspection conditions include a plurality of setting items which each affect determination of whether the inspection result indicates an abnormality.

24. The image forming system according to claim 19, wherein the test printing involves printing a part of a page to be printed.

25. The image forming system according to claim 19, wherein the controller is configured to control the display to present which of printing which is the test printing and printing other than the test printing is executed.

* * * * *